United States Patent [19]

Copeland

[11] Patent Number: 4,690,305

[45] Date of Patent: Sep. 1, 1987

[54] SOLID BLOCK CHEMICAL DISPENSER FOR CLEANING SYSTEMS

[75] Inventor: James L. Copeland, Burnsville, Minn.

[73] Assignee: Ecolab Inc., St. Paul, Minn.

[21] Appl. No.: 796,017

[22] Filed: Nov. 6, 1985

[51] Int. Cl.[4] .......................... B67D 5/00; B01D 11/02

[52] U.S. Cl. ....................................... 222/52; 222/185; 222/189; 222/190

[58] Field of Search .................... 222/52, 67, 185, 189, 222/190; 422/263, 264, 266

[56] References Cited

U.S. PATENT DOCUMENTS

| | | | |
|---|---|---|---|
| 404,354 | 5/1889 | Huber | 422/266 |
| 871,612 | 11/1907 | Nesfield | 424/16 |
| 1,325,361 | 12/1919 | Harshberger | 252/93 |
| 1,380,388 | 6/1921 | Kaufman | 252/93 |
| 1,798,428 | 3/1931 | Lindgren | 134/93 |
| 1,932,070 | 10/1933 | Grant et al. | 141/9 |
| 1,945,351 | 1/1934 | Grafton | 220/62 |
| 1,949,264 | 2/1934 | Bagley | 226/69 |
| 1,975,749 | 10/1934 | Lang | 141/9 |
| 1,988,000 | 1/1935 | Estler | 225/12 |
| 2,031,853 | 2/1936 | Potts | 226/93 |
| 2,083,076 | 6/1937 | Mau | 23/268 |
| 2,120,807 | 6/1938 | Kundel | 299/34 |
| 2,138,943 | 12/1938 | Sinkwich | 141/9 |
| 2,238,969 | 4/1941 | Butterfield | 299/34 |
| 2,288,791 | 7/1942 | Culliton | 299/83 |
| 2,308,612 | 1/1943 | Lehmkuhl | 23/272 |
| 2,333,443 | 11/1943 | Robinson | 252/135 |
| 2,370,609 | 2/1945 | Wilson et al. | 175/183 |
| 2,371,720 | 3/1945 | Stine | 299/83 |
| 2,382,163 | 8/1945 | MacMahon | 252/138 |
| 2,382,164 | 8/1945 | MacMahon | 252/138 |
| 2,382,165 | 8/1945 | MacMahon | 252/135 |
| 2,387,945 | 10/1945 | McDow | 299/84 |
| 2,412,819 | 12/1946 | MacMahon | 252/138 |
| 2,477,998 | 8/1949 | McCowan | 299/83 |
| 2,604,386 | 7/1952 | Arant | 23/309 |
| 2,613,922 | 10/1952 | Gatchet | 259/4 |
| 2,641,506 | 6/1953 | Lowthers | 293/32 |
| 2,686,080 | 8/1954 | Wood | 299/83 |
| 2,698,022 | 12/1954 | Fahnoe | 137/79 |
| 2,733,323 | 3/1956 | Tepas, Jr. | 210/28 |
| 2,768,328 | 4/1957 | Merget | 252/135 |
| 2,802,724 | 8/1957 | Johnson | 23/267 |
| 2,820,701 | 1/1953 | Leslie | 23/271 |
| 2,920,417 | 1/1960 | Wertheimer | 45/28 |
| 3,048,548 | 8/1962 | Martin et al. | 252/135 |
| 3,070,316 | 12/1962 | Miville | 239/312 |

(List continued on next page.)

OTHER PUBLICATIONS

Economics Laboratory, Inc., Warhead Chlorinated Brick Detergent, p. 1.

Klenzade Products, Inc., Detergent Bricks, pp. 1-2.

Economics Laboratory, Inc., Model C-8, pp. 1-3.

Economics Laboratory, Inc., C-33 Hydraulic Reservoir, p. 1.

(List continued on next page.)

*Primary Examiner*—Robert J. Spar
*Assistant Examiner*—Jay I. Alexander
*Attorney, Agent, or Firm*—Merchant, Gould, Smith, Edell, Welter & Schmidt

[57] ABSTRACT

A solid block chemical dispenser for cleaning systems. A substantially horizontal support screen within a housing retainably supports a solid block of wash chemical thereabove. The support screen divides the housing into an upper cylindrical storage portion and a lower funnel shaped collector portion. A spray forming nozzle is mounted within the collector portion below the generally horizontal screen for directing a spray of water at substantially the entire downwardly facing surface of the wash chemical block supportably retained above the support screen. The dissolved wash chemical passes through the support screen, is collected by the collector portion of the housing, and directed to its utilization point. Spray controls, either manual or electronic, control the spray of water through the nozzle in response to a control signal. The dispenser is configured for mounting to a vertical surface and is loaded through an upper access port normally closed by a door. A safety switch prevents the spray of water from the nozzle whenever the door is open.

6 Claims, 15 Drawing Figures

U.S. PATENT DOCUMENTS

| | | | |
|---|---|---|---|
| 3,092,515 | 6/1963 | Pike et al. | 134/25 |
| 3,166,513 | 1/1965 | Mizuno et al. | 252/99 |
| 3,174,934 | 3/1965 | Shen | 252/135 |
| 3,227,524 | 1/1966 | White | 422/263 X |
| 3,306,858 | 2/1967 | Oberle | 252/99 |
| 3,322,507 | 5/1967 | Smith | 23/267 |
| 3,322,674 | 5/1967 | Friedman | 252/90 |
| 3,334,147 | 8/1967 | Brunnelle et al. | 260/611 |
| 3,399,676 | 9/1968 | McLaughlin | 128/229 |
| 3,417,024 | 12/1968 | Goldwasser | 252/135 |
| 3,441,511 | 4/1969 | Otrhalek et al. | 252/135 |
| 3,444,242 | 5/1969 | Rue et al. | 260/611 |
| 3,535,258 | 10/1970 | Sabatelli et al. | 252/105 |
| 3,556,982 | 1/1971 | Kaminsky et al. | 208/11 |
| 3,574,561 | 4/1971 | Nickerson et al. | 23/282 |
| 3,579,455 | 5/1971 | Sabatelli et al. | 252/135 |
| 3,595,438 | 7/1971 | Daley et al. | 222/67 |
| 3,639,286 | 2/1972 | Ballestra et al. | 252/109 |
| 3,680,070 | 7/1972 | Nystuen | 340/244 |
| 3,687,613 | 8/1972 | Rickard | 423/242 |
| 3,700,599 | 10/1972 | Mizuno et al. | 252/99 |
| 3,727,889 | 4/1973 | Nagel | 259/1 R |
| 3,816,427 | 6/1974 | Loliger et al. | 23/271 |
| 3,850,344 | 11/1974 | Burge et al. | 222/67 |
| 3,856,932 | 12/1974 | May | 424/16 |
| 3,899,436 | 8/1975 | Copeland et al. | 252/99 |
| 3,933,169 | 1/1976 | Halley | 422/263 X |
| 3,933,670 | 1/1976 | Brill et al. | 252/99 |
| 3,936,386 | 2/1976 | Corliss et al. | 252/99 |
| 4,014,808 | 3/1977 | Herpers, Jr. et al. | 252/135 |
| 4,020,865 | 5/1977 | Moffat et al. | 137/268 |
| 4,063,663 | 12/1977 | Larson et al. | 222/52 |
| 4,241,025 | 12/1980 | Grayson, IV et al. | 422/263 |
| 4,426,362 | 1/1984 | Copeland et al. | 422/263 |
| 4,571,327 | 2/1986 | Larson et al. | 422/263 |

OTHER PUBLICATIONS

Economics Laboratory, Inc., Detergent Reservoirs, pp. 1-2.

Economics Laboratory, Inc., Model C-11, pp. 1-2.

Economics Laboratory, Inc., Model C-4, pp. 1-2.

SOLID BLOCK CHEMICAL DISPENSER FOR CLEANING SYSTEMS

TECHNICAL FIELD

The invention relates broadly to the dispensing of solid water soluble compositions used in cleaning processes. More particularly, the invention relates to the dispensing of wash chemical compositions in a solid, a block or a cast form. Such wash chemicals include detergents, rinse aids, and the like. Typically in use the solid wash chemical composition can be contacted with an aqueous liquid to create a concentrated working solution.

BACKGROUND OF THE INVENTION

Automated institutional and industrial warewashing machines are generally configured with one wash tank for maintaining a readily available supply of a cleaning solution for use in the machine. During normal usage, at least a portion of, or all of, the used cleaning solution is discarded in order to keep the cleaning solution as clean as possible. Fresh water or other clean recycled water can be added to the wash tank to maintain an appropriate liquid level, thereby diluting the concentration of detergent in the solution. To obtain a cleaning solution at the most efficient cleaning concentration, a measured amount of a concentrated aqueous detergent solution can be periodically added to the reservoir by an auxiliary detergent dispenser where it is mixed with the fresh or recycled rinse water to form a cleaning solution of the desired strength.

Automated institutional and industrial ware washing machines can add a rinse aid to the rinse water to promote sheeting and reduce water spotting on the washed ware using an auxiliary rinse aid dispenser.

Automated institutional and industrial fabric washing machines typically create a new cleaning solution for each cleaning cycle to which is added detergent, bleach, fabric softener and other additives. Accordingly, fabric washing additives are added to the wash water by auxiliary dispensers.

Wash chemical dispensers, used in processes as described above, typically have been designed for automatic or semi-automatic operation. The automated dispensers eliminate the need for constant operator attention to the cleanliness of the wash water and concentration of cleaner in the wash tank. Further, automated dispensers minimize operator error due to operator misjudgement in timing or in the amount of wash chemical to be added to the wash tank, and provide greater accuracy in maintaining the optimum concentration level of wash chemicals in the system.

A number of different techniques have been developed and used for converting a solid wash chemical into a concentrated wash chemical solution. The majority of such devices have been designed to convert solid detergent from its "powdered" form. See for example Daley et al, U.S. Pat. No. 3,595,438, issued July 27, 1971; Moffet et al, U.S. Pat. No. 4,020,865, issued May 3, 1977; and Larson et al, U.S. Pat. No. 4,063,663, issued Dec. 20, 1977. For this reason wash chemical dispensers will be discussed with respect to the dispensing of detergents.

One detergent dispenser technique for converting powdered detergent, is the so-called "water-in-reservoir" type. In the water-in-reservoir dispenser, the powdered detergent is completely submerged in an aqueous solution. A stand-pipe, usually located near the center of the dispenser tank, maintains a constant water/solution level within the dispenser tank. As water is added to the dispenser tank, a concentrated, often saturated detergent solution or slurry is formed by the swirling action or agitation of the powdered detergent by the injected water. The added water also causes a portion of the solution or slurry in the reservoir to flow into the stand-pipe, which supplies the wash tank of the washing apparatus with the wash chemical. Such techniques are not practical for use with powdered detergents containing incompatible components (such as an active chlorine source in combination with a defoamer) as they tend to react upon contact when in solution. Further, there may be safety hazards involved with the use of such dispensers. Charging or recharging of such dispensers requires an operator to place detergent directly into standing water. Since the water-in-reservoir type of dispensers are typically mounted at about eye level or higher with respect to the operator, any splashing or splattering caused by adding the detergent directly into the concentrated solution poses the danger of spraying concentrated detergent solution onto the eyes, face and skin of the operator.

Another technique for converting a powdered detergent into a concentrated detergent solution, involves the technique of placing the powdered detergent over the convex side of a conical or hemispherical screen having a mesh size smaller than the powdered detergent particles supported thereby. The powdered detergent directly overlies the support screen is dissolved as needed, by a fine mist or spray of water from a nozzle disposed below and on the concave side of the screen. The concentrated detergent solution formed by the action of the water falls by gravity into an underlying reservoir, or is directed by a conduit to the wash tank of the washing apparatus. (See, for example, U.S. Pat. Nos. 3,595,438 issued to Daley et al; 4,020,865 issued to Moffat et al; and 4,063,663 issued to Larson et al.) This technique solves many of the problems associated with the water-in-reservoir type of dispenser as (i) the entire charge of powdered detergent is not wetted, and (ii) an operator loading detergent into the dispenser is not placing detergent directly into standing water and therefore is not subjected to possible boil-over or splattering of the detergent solution.

While the powdered detergent dispensers such as described by the Daley, Moffat and Larson patents have represented significant contributions to the art of detergent dispensing, the use of solid detergent in powdered form has a number of drawbacks in commercial applications. Due to increased sanitary standards and demands for shorter wash times, recently developed powdered detergents have relatively more complex detergent compositions that are more hazardous to the user, less stable and more difficult to dissolve in a satisfactorily uniform manner. Powdered detergents dissolve generally readily because of their high specific surface areas. However, when such powdered detergents include a mixture of a number of components having relatively different dissolving rates, such detergents are susceptible to differential solubility problems in automatic detergent dispensers, depending upon the rate of dispensing or the residence (dwell) time of contact between the detergent powder and the dissolving liquid. Those particles having a greater rate of solubility and/or a greater specific surface tend to dissolve first, whereas those having a lower solubility rate and/or a lower specific surface tend to dissolve last. Another problem associated with powdered detergents is the incompatibility and/or instability of particular detergent components required for good cleaning action, when these components are mixed and added to a powdered detergent composition.

Another problem inherent in powdered detergent is segregation of different sized particles during manufacturing, shipping and handling. Even when uniform distribution can be achieved during manufacture, subsequent shipping and handling may cause segregation, leading to non-uniformity in the composition of the detergent when it is withdrawn from the container. Another disadvantage of powdered detergents when handled in bulk form is that they are quite susceptible to spillage onto the floor, on the washing machine, etc. by the user.

Another form of solid detergent is the briquette form, comprising pre-shaped briquettes of solid detergent. Dispensing systems for dissolving detergent briquettes are known in the art. See, for example, U.S. Pat. Nos. 2,382,163, 2,382,164 and 2,382,165 all issued Aug. 14, 1945 to MacMahon, and U.S. Pat. No. 2,412,819, issued Dec. 17, 1946 to MacMahon. In the MacMahon systems, the detergent briquettes are dispensed from a modified water-in-reservoir dispenser wherein a number of the briquettes are held in a mesh basket forming a slot across the diameter of the reservoir. A stream of water directed against the lowermost briquette, in combination with the swirling action of water engaging the submerged portion of the lower-most briquette provides the dissolving action. The primary advantage of using detergent briquettes in such dispensers is that the user can visually determine when the detergent dispenser reservoir needs a replenishing charge of detergent. As with the water-in-reservoir type of dispenser, however, water is left standing in the reservoir, and a portion of the briquettes are submerged within that water. Accordingly, where there are incompatible components within the detergent briquettes, there can be undesirable interaction therebetween. Further, if the detergent contains a defoamer, that defoamer tends to float to the top of the reservoir during periods of inactivity, forming a slag at the water surface. For these and other reasons, the briquette detergent approach has not attained that degree of commercial success in the conventional institutional and industrial washing machine art, as has the powdered detergent dispensing approach.

Still another, more recent form, of solid detergent is the "cast" or block form, comprising detergent cast within a mold or container. Dispensing systems for dissolving these cast solids are known in the art. See, for example, U.S. Pat. No. 4,426,362 issued to Copeland et al and commonly owned copending U.S. patent applications Ser. No. 234,940 new U.S. Pat. No. 9,569,781 and Ser. No.-509,916, now U.S. Pat. No.4,569,780. The cast detergent is dispensed from a dispenser wherein a solvent sprayed onto the detergent block held within its container, impinging upon at least one exposed surface of the detergent to form a concentrated working solution. The concentrated working solution falls into a reservoir or is directed by a conduit to the wash tank of the washing apparatus. When the chemical compound within the container is completely utilized, the exhausted container can be removed and a fresh container can be placed in the dispenser.

Additional featues have been sought by users of solid block dispensers including (i) an increase in the number of solid blocks of detergent capable of being held by the dispenser (i.e. the ability to add additional blocks without having to wait until the present block is completely used), (ii) providing a relatively constant wash chemical dispensing rate, and (iii) reducing the unit cost of the wash chemical.

Accordingly, a need exists for a dispensing apparatus which can simply, safely, efficiently and inexpensively dispense a homogeneous, uniform, concentrated wash chemical solution from a solid block of wash chemical at relatively constant concentrations.

CONTAINERS

Containers utilized for storing and dispensing of solid wash chemicals depend upon the form of the solid detergent. Flaked or granular wash chemicals are typically packaged in sturdy paper board containers, which are treated to prevent the passage of moisture into the package. Typically, the granular wash chemical is dispensed from the box by either (i) ripping a hole in the box or (ii) opening a reclosable spout provided on a side panel of the box. This type of container is unsuitable for nonflowing, solid block wash chemicals.

Containers for solid tablet or briquette wash chemicals typically take the form of paper or plastic wrappers which completely surround the tablet or briquette. The wash chemical is dispensed by removing the wrapper entirely and placing the tablet or briquette into the dispenser. The drawbacks associated with this type of container for wash chemicals are: (i) they require physical contact of the skin with the wash chemical which should be avoided, and some compositions, such as highly alkaline compounds, can cause severe "burns", and (ii) the wash chemical must be formed in one step and packaged in a second step, requiring additional packing time and expense.

Solid, cast wash chemicals are preferably cast in a sturdy solid plastic container which can act both as a mold and as a dispenser housing. The cast wash chemical can be dispensed by inverting the container in the dispenser and impinging solvent directly into the container and onto the exposed surface or surfaces of the wash chemical.

Hazardous chemicals such as highly alkaline detergents are preferably packaged such that they can be dispensed without coming into physical contact with the human body. The paper and/or plastic wrappers typically utilized with tablet and briquette solid detergents are not adequate for this purpose as they require a large amount of handling to remove the wrapper and place the tablet or briquette into the dispenser after the wrapper has been removed.

In addition, the utilization of a paper or plastic wrapper requires that the tablet and/or briquette be formed prior to being wrapped and in a second step wrapped with the paper or plastic wrapping.

Accordingly, in certain applications a need exists for an inexpensive solid block wash chemical container which minimizes the possibility of skin contact with the wash chemical when placing the wash chemical in a dispenser; allows the solid wash chemical to be formed and packaged in a single step; and allows more than one wash chemical charge to be inserted into a dispenser at one time.

SUMMARY OF THE INVENTION

The invention comprises a wash chemical dispenser for dispensing a concentrated wash chemical solution from a solid block of wash chemical. The dispenser includes a housing suitable for fixed predetermined mounting to a solid mounting surface. The dispenser can be mounted vertically or horizontally, directly to a washing apparatus to which the concentrated wash chemical solution is to be supplied, adjacent to such washing apparatus, or at a position remote from such washing apparatus.

The housing includes an upper cylindrical-storage portion for retainably holding a mass of solid block wash chemical, and defines an upwardly disposed access port through which solid block wash chemical is loaded into the housing. The access port is normally covered by a door mounted on the housing. The lower portion of the housing is configured in a funnel shaped collector portion that is downwardly coveraging to an outlet port, preferably in a funnel shape. The housing is designed for mounting such that the vertical height of the outlet port from the collector portion of the housing is higher than that of the wash chemical solution's utilization point. A conduit is connected to the outlet port of the housing for directing wash chemical solution therethrough by means of gravity feed from the collector portion of the dispenser to its utilization point. Alternatively, the wash chemical solution may be pumped from the collector portion of the dispenser to its utilization point.

A flat generally horizontal continuous support screen is mounted to the inner walls of the housing at a position therealong defining the intersection of the upper storage portion and the lower collector portion of the housing. The support screen mesh size supports the solid block of wash chemical without significantly impeding access of a water spray onto the lower face of the wash chemical (typically about 1 square inch openings). Spray forming means are axially mounted in the collector portion of the housing.

The spray forming nozzle is connected to a pressurized source of water by means of a water supply line. Spray control means including a valve in the water supply line controls the flow of water to the spray-forming nozzle. In operation, the valve normally blocks water flow to the nozzle and is operative in its open position only upon receipt of an external control signal. Upon receipt of such a control signal, water flow is directed through the supply line and the nozzle and into engagement with substantially the entire lower surface of the support screen. Spray from the nozzle is of relatively low pressure (typically 10 to 25 p.s.i.) and wets only that portion of the solid block wash chemical carried immediately above the support screen. The dissolved wash chemical passes in solution through the support screen and is directed by the underlying collector portion of the housing to the outlet port thereof and through the conduit to its utilization point.

In the embodiment utilizing the wash chemical pump, the wash chemical solution pump is operative in response to a control signal from the utilization point (i.e. the washing machine). A float is positioned within the collector portion of the housing and operatively connected to the spray control means for controlling the flow of water to the nozzle, so as to maintain a constant level of wash chemical solution, below the nozzle, in the collector portion. When the level of wash chemical solution in the collector portion of the housing is below the desired constant level due to operation of the wash chemical pump, the spray control means is open to the flow of water therethrough and additional wash chemical solution is formed until the float returns to its desired level. The rate of creation of wash chemical solution should be slightly greater than the rate at which it is pumped out of the collector portion of the housing to prevent the entrainment of air. This type of dispenser is particularly useful when introducing the wash chemical solution into a pressurized line or tank or a remote utilization point and prevents the entrainment of air into the pump and early pump failure.

Optionally, a ¼ to 1/20 inch (0.63 to 0.13 cm) lower screen can be placed in the collector portion of the housing between the spray nozzle and the outlet port to catch any undissolved chunks of wash chemical small enough to pass through the support screen. This prevents small chunks of wash chemical collecting in the outlet port or the conduit connected thereto and blocking the flow of concentrated wash chemical solution out of the dispenser.

An electrically or mechanically actuated safety control switching circuit can be connected to sense the operative position of the door covering the access port to the housing and prevent water spray from the nozzle whenever the door is not in its closed position overlying the access port. This prevents the spray of concentrated wash chemical solution while an operator is loading the dispenser.

While the present invention will be described in combination with a particular configuration of the dispenser housing, it will be understood that other configurations could be designed within the spirit and scope of this invention. Further, while the preferred embodiment of the invention will be described in combination with specific electronic control modules for providing control signals to the spray control means regulating water flow to a spray nozzle, it will be understood that other control circuits, including mechanical, hydraulic, and optical systems, could equally well be configured within the spirit and scope of this invention. Similarly, while specific safety feature circuits and techniques will be described with respect to the preferred embodiments of this invention, other safety control means including purely mechanical linkage safety systems could equally well be devised within the scope of this invention which would render the dispensing apparatus non-hazardous to an operator of the device.

The solid block of wash chemical is housed in a deformable container having an open face and a removable cap or lid closing the open face.

The wash chemical may be cast or compressed directly into an open faced deformable container with the cap or lid attached to the container by means of a threaded fitting, a friction fitting, adhesive, etc. Preferably a paraffin wax coated cellulosic sheet is adhesively bonded to the leading edge of the container. At the point of use, the cap or lid is removed, the container inverted over the access port of the dispenser and the container distorted in order to break the bonds holding the solid block of wash chemical in the container, thereby allowing the solid block of wash chemical to fall from the container onto the support screen.

As used herein, the term "utilization point", when used in combination with wash chemical solution, refers to the place where the solution is used such as a wash tank, a rinse spray nozzle, etc.

As used herein, the term "wash chemical" refers to those chemical compounds or chemical mixtures commonly added to aqueous liquids present in machine washing units to aid in the cleaning and rinsing of fabrics and wares. Such wash chemicals include detergents, softeners, bleaches, rinse aids, etc.

DESCRIPTION OF THE PREFERRED EMBODIMENTS

Figure 1:
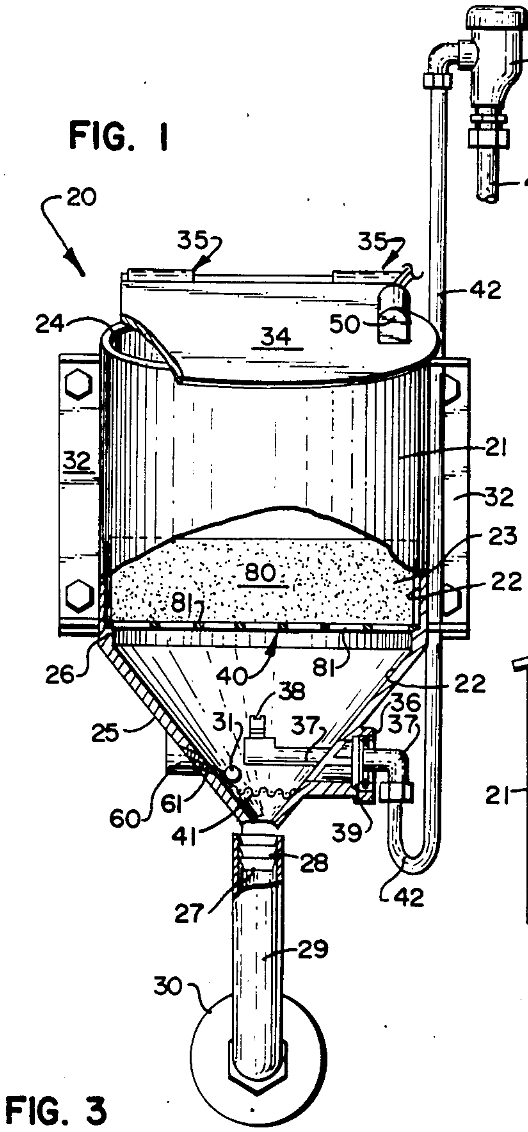
FIG. 1 is a front view, with portions thereof broken away, of the dispenser of this invention, utilizing a wash chemical solution pump.

Referring to the Figures, there is generally disclosed at 20 a container or housing. The housing has a generally cylindrical upper storage portion 21 having a cylindrical inner wall 22. The wall 22 defines an internal cavity 23. The upper terminous of the storage portion 21 defines an access port 24 into cavity 23 of storage portion 21.

Inner wall 22 of housing 20 converges in the downward direction, defining a lower funnel-shaped collector portion 25 of housing 20. Inner wall 22 of housing 20 is configured to form an annular flange at 26 circumferentially extending around inner wall 22 of housing 20 at the juncture of upper storage portion 21 and lower collector portion 25. The lower terminous of collector portion 25 defines an outlet port 27 from internal cavity 23 for passage therethrough of solution collected by collector portion 25. Outlet port 27 has a hose clamp extension 28 having a plurality of annular ribs configured for engaging the inner walls of a connecting hose or conduit 29.

The outlet port 27 may be directly connected with the wash chemical solution utilization point by conduit 29 and feed thereto by gravity as it is created or feed thereto by a wash chemical solution pump 30 placed in conduit 29.

Housing 20 may be constructed of any suitable material which is capable of withstanding exposure to highly caustic solutions, and is preferably configured of stainless steel or molded plastic material. Preferably housing 20 is constructed of a transparent or translucent material to allow the operator to see at a glance the amount of wash chemical in storage portion 21 and if dispenser 20 needs to be refilled. If housing 20 is not made of a transparent or translucent material, preferably a portion of storage portion 21 is made transparent or translucent to aid in determining when dispenser 20 should be refilled. A pair of mounting plates 32 are connected to and extend rearwardly from the outer surface of housing 20 for securely mounting housing 20 to a vertical side wall, generally designated as 100. A brace member 33 extends across the back surface of housing 20, connecting the pair of mounting plates 32 and adding structural support to the dispenser housing 20.

A door 34 is sized to extend entirely across and to sealingly close access port 24. Door 34 is pivotally mounted to the brace member 33 at 35 for pivotal motion between a closed position, illustrated in full line in FIGS. 1 and 2, to an open position, illustrated in dashed lines in FIG. 2. The lower collector portion 25 of housing 20 has an outwardly projecting coupling portion 36 extending from collector portion 25 adjacent outlet port 27 of collector portion 25. A tube fitting insert 37 is secured within coupling projection 36 and projects through inner wall 22 of collector portion 25 of housing 20. A spray-forming nozzle 38 is threaded into the end of tube insert 37 and is axially aligned within inner cavity 23 of housing 20 in a direction so as to direct an upwardly projected spray pattern therefrom. Tube fitting insert 37 is provided with an O-ring seal 39.

A horizontal support screen 40 is mounted in resting engagement upon annular flanged portion 26 of housing 20. Support screen 40 has about 1 inch square openings in order to support a solid block of wash chemical 80 without significantly interfering with the impingement of water sprayed from nozzle 38 onto the lower surface 81 of the wash chemical block 80 (i.e. the surface in contact with support screen 40).

A $\frac{1}{4}$ to 1/20 inch (0.63 to 0.13 cm) lower screen 41 is placed in collector portion 25 of housing 20 between spray nozzle 38 and outlet port 27 to catch any undissolved chunks of wash chemical 80 small enough to pass through support screen 40. This prevents small chunks of wash chemical 80 collecting in outlet port 27 or conduit 29 and blocking the flow of concentrated wash chemical solution out of dispenser 20.

Figure 2:
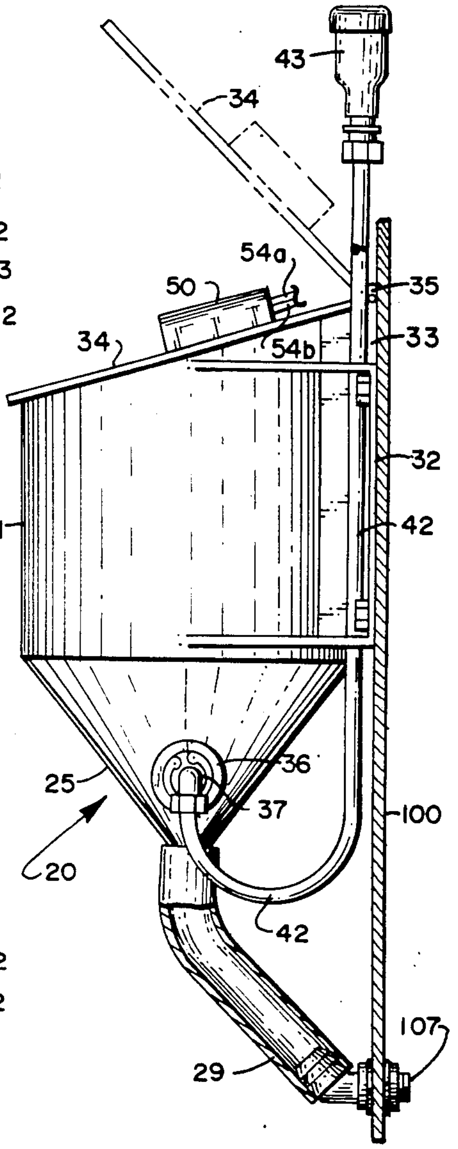
FIG. 2 is a side view of the dispenser disclosed in FIG. 1 without the wash chemical solution pump and accessories necessary for use of the pump.
Figure 3:
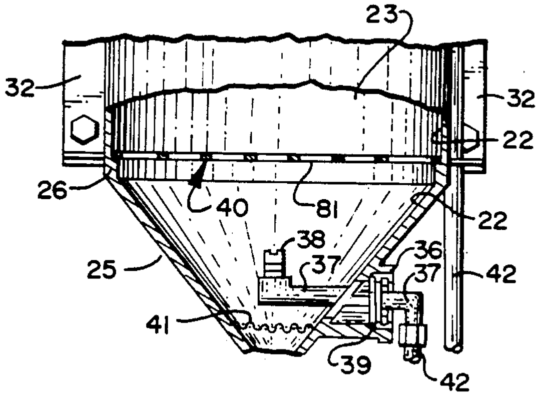
FIG. 3 is a partial sectional view of the collector portion of the dispenser shown in FIG. 2.
Figure 4:
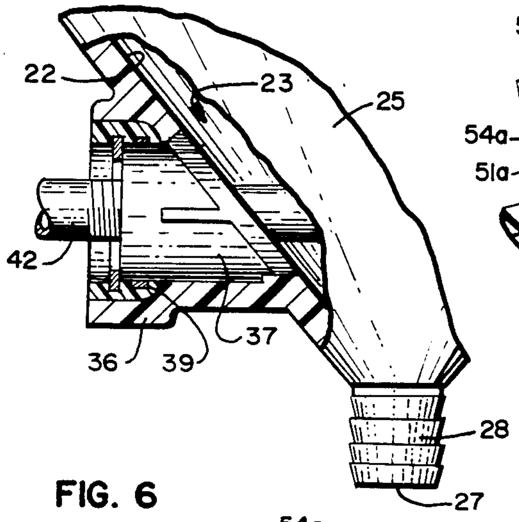
FIG. 4 is an enlarged fragmentary view, with portions thereof broken away, of the lower part of the collector portion of the dispenser shown in FIG. 2.

A water supply inlet pipe 42 is connected to tube insert 37 and is in communication therewith for providing a source of water flow to spray-forming nozzle 38. Water supply line 42 passes through one of the mounting plate members 32, as illustrated in FIGS. 1 and 2, and receives structural support therefrom. A siphon breaker 43 interrupts water supply line 42.

Figure 5:
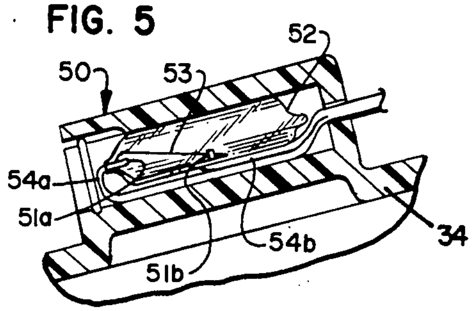
FIG. 5 is an enlarged sectional view of the safety control switch portion of the preferred embodiment of the dispenser disclosed in FIG. 2.
Figure 5A:
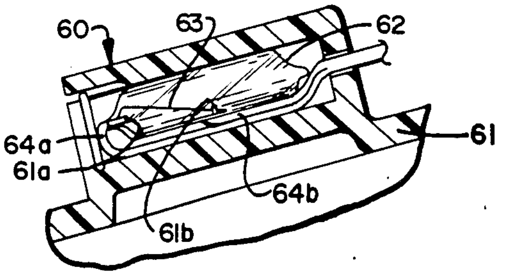
FIG. 5A is an enlarged section view of the control switch portion of the preferred embodiment of the dispenser disclosed in FIG. 1.
Figure 8:
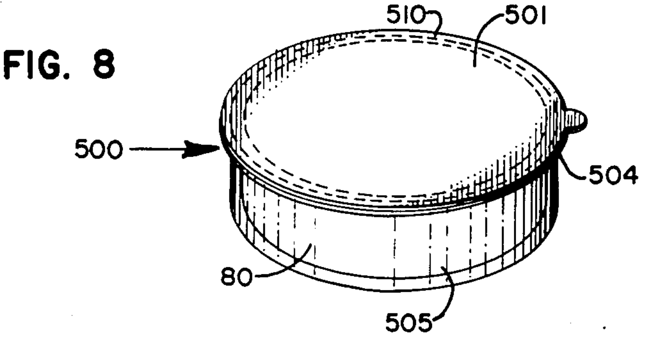
FIG. 8 is a perspective view of the container of this invention.
Figure 9:
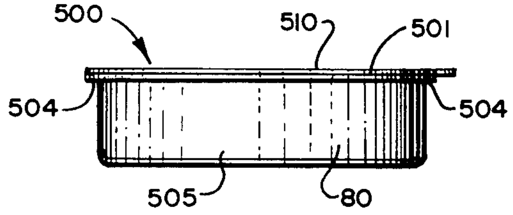
FIG. 9 is a front view of the container of this invention.

In the embodiment utilizing the wash chemical solution pump 30, the pump 30 is operative in response to a control signal from the utilization point (i.e. a washing machine). A float 31 is positioned within collector portion 25 of housing 20 and operatively connected by float extension bar 61 to float switch 60. Float switch 60 is operatively connected to spray control means 43 for controlling the flow of water to the nozzle 38, so as to maintain a constant level of wash chemical solution in collector portion 25. When the level of wash chemical solution in collector portion 25 of housing 20 is below the desired constant level due to operation of the wash chemical pump 30, the float switch 60 is electrically closed and spray control means 43 opened to the flow of water therethrough and additional wash chemical solution is formed until float 31 returns to its desired level. Float switch 60 is in communication with float extension bar 61 for sensing the operative position of float extension bar 61 with respect to the position of float 31. In the preferred embodiment, float switch 60 comprises a mercury actuated switch, diagramatically illustrated in FIG. 5*a*. Referring thereto, float switch 60 generally has a pair of contacts 61*a* and 61*b* projecting within an insulating bulb 62 which entraps a fluid conductive medium 63 such as mercury. Switch 60 is mounted upon float extension bar 61 such that when float extension bar 61 is operatively positioned so as to indicate the desired level of wash chemical solution in collector portion 25, the mercury 63 does not provide an electrical shorting path between first and second terminals 61*a* and 61*b* of switch 60. When float 31 is lowered due to a decrease in the amount of wash chemical in collector portion 25, the angle of float extension bar 61 is pivotally altered and the mercury 63 flows within a bulb 62 to engage the first terminal 61*a* so as to provide an electrical circuit path between first and second terminals 61*a* and 61*b*, thus electrically closing float switch 60. Conduction paths are provided from first and second terminals 61*a* and 61*b* by means of a pair of conductor members 64*a* and 64*b* respectively, conduction member 64*a* coupled to a power source 201 and conduction member 64*b* coupled to spray control means 43. This type of dispenser is particularly useful when introducing the wash chemical solution into a pressurized line or tank or a remote utilization point and also prevents the entrainment of air into wash chemical pump 30 and early failure of the pump 30.

A safety switch 50 is mounted to door 34 for movement therewith and senses the operative position of door 34 relative to access port 24 of housing 20. In the preferred embodiment, safety switch 50 comprises a mercury actuated switch, diagrammatically illustrated in FIG. 5. Referring thereto, safety switch 50 generally has a pair of contacts 51*a* and 51*b* projecting within an insulating bulb 52 which entraps a fluid conductive medium 53 such as mercury. Switch 50 is mounted upon door 34 such that when door 34 is operatively positioned so as to close external access to the upper storage portion 21 of housing 20, the mercury 53 provides an electrical shorting path between first and second terminals 51*a* and 51*b* of switch 50. When door 34 is pivotally open so as to enable access to internal cavity 23 of housing 20, the mercury 53 flows within bulb 52 away from engagement with the first terminal 51*a* so as to break the electrical circuit path between first and second terminals 51*a* and 51*b*, thus electrically opening safety switch 50. Conduction paths are provided from first and second terminals 51*a* and 51*b* by means of a pair of conductor members 54*a* and 54*b* respectively, conduction member 54*a* coupled to the float switch 60 when solution pump 30 is used and and to a power sourced 201 when solution pump 30 is not used; and conduction member 54*b* coupled to spray control means 43.

Figure 6:
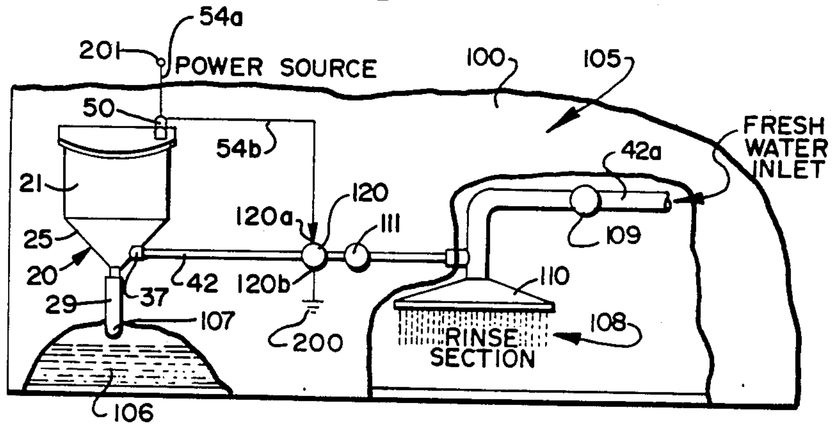
FIG. 6 is a schematic block diagram illustrating the circulatory and basic electrical signal flow paths of the dispensing system of one embodiment of this invention.

A block diagram of the circuit and fluid flow paths for the dispenser apparatus as connected within a hydraulic, manually controlled gravity feed system is illustrated in FIG. 6. Referring thereto, dispenser housing 20 is illustrated as mounted to a side wall 100 of a washing machine 105. Washing machine 105 has a wash tank 106 for storing a supply of detergent solution for use within the machine. Conduit 29 extends from outlet port 27 of housing 20 and is connected to a hose clamp extension 107 extending through side wall 100 of washing machine 105 and terminating at a position directly overlying wash tank 106. Washing machine 105 also has a fresh water supply line 42*a* connected to a pressurized source of water (not illustrated). Water line 42*a* directly provides clean rinse water to the rinse section 108 of wash machine 105 and branches out to water supply line 42 for providing fresh water to spray-forming nozzle 38 as well. A rinse valve 109, either manually or electronically controlled, is connected to water supply line 42*a* at a position upstream from the rinse head 110 and upstream from the input to water supply line 42. A flow control valve 111 is connected in water supply line 42 leading to sprayforming forming nozzle 38 and regulates the rate of flow of water to spray-forming nozzle 38. A safety control valve 120 is connected in the water supply line 42. The safety control valve 120 is, in the preferred embodiment, a solenoid actuated valve having an input control terminal 120*a* and a common terminal generally designated at 120*b*. The common terminal 120*b* is directly connected to a reference potential generally designated at 200.

The first conductor 54*a* leading from the safety switch 50 is directly connected to an appropriate power source 201. The second conductor 54*b* leading from the safety switch 50 is directly connected to the control input terminal 120*a* of the solenoid actuated safety control valve 120.

Control of the dispensing of the wash chemical block 80 from dispenser 20 is done by controlling the flow of water to spray nozzle 38. This may be done in a number of ways including mechanical means such as hydraulic timer valves and electrical means such as electrical switching in the washing machine 105 control system (not illustrated), conductivity sensing means in wash tank 106 and electrical timers.

Figure 6A:
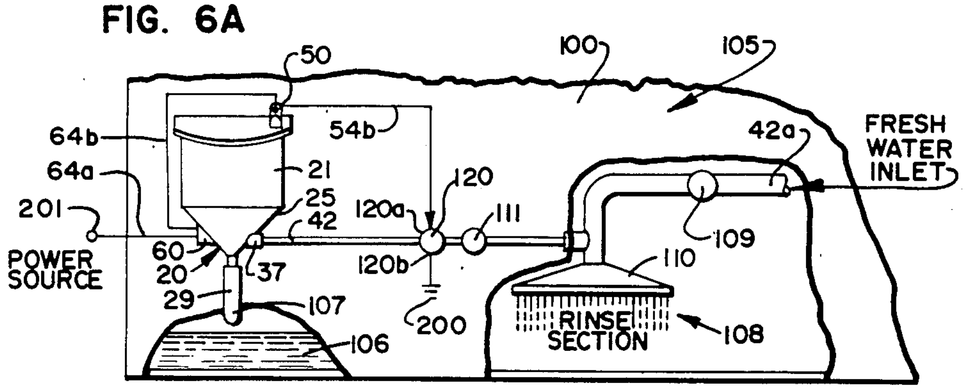
FIG. 6A is a schematic block diagram illustrating the circulatory and basic electrical signal flow paths of the dispensing system of this invention utilizing the float control switch.
Figure 10:
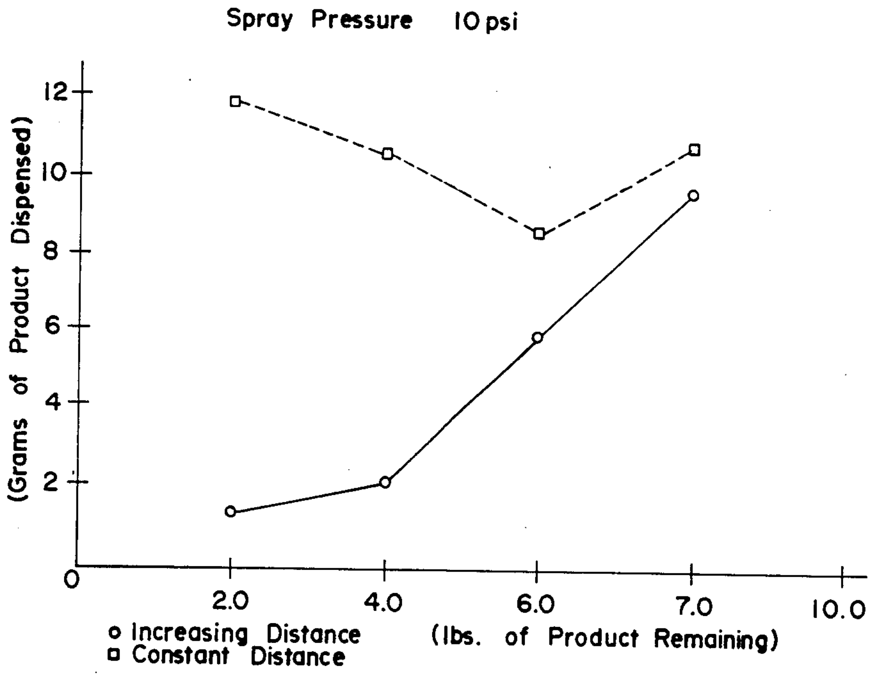
FIGS. 10-13 are graphs of the results of tests of the amount of product dissolved as a function of the amount of product remaining in the dispenser at different spray pressures.
Figure 11:
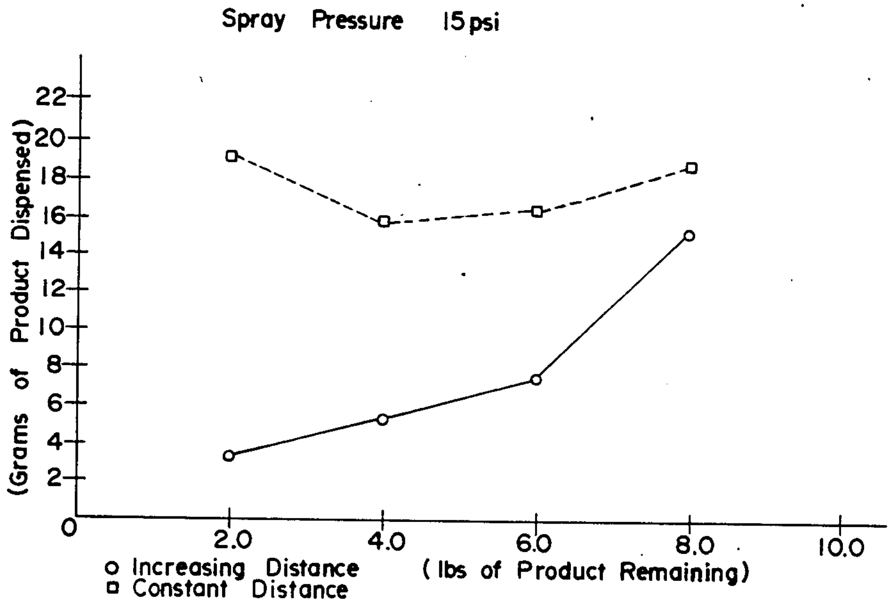
Figure 12:
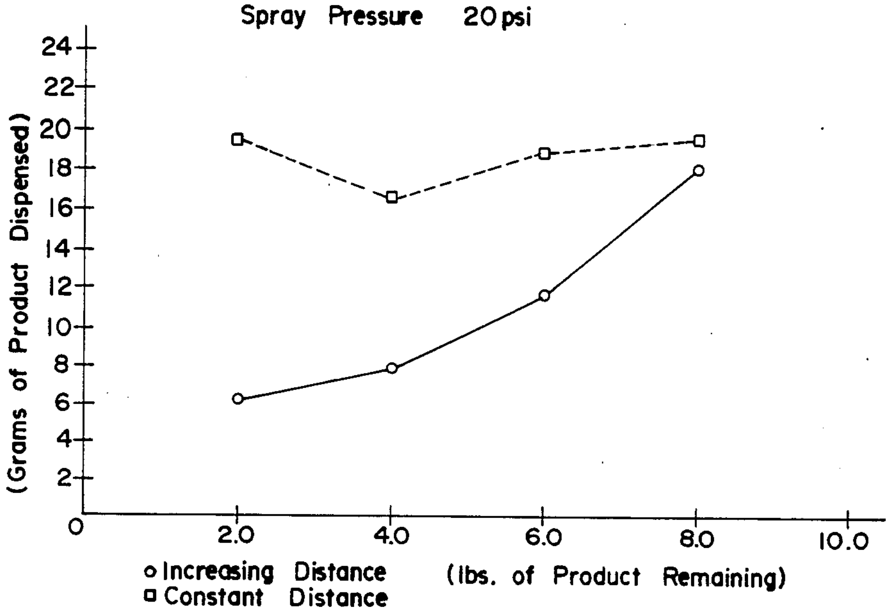
Figure 13:
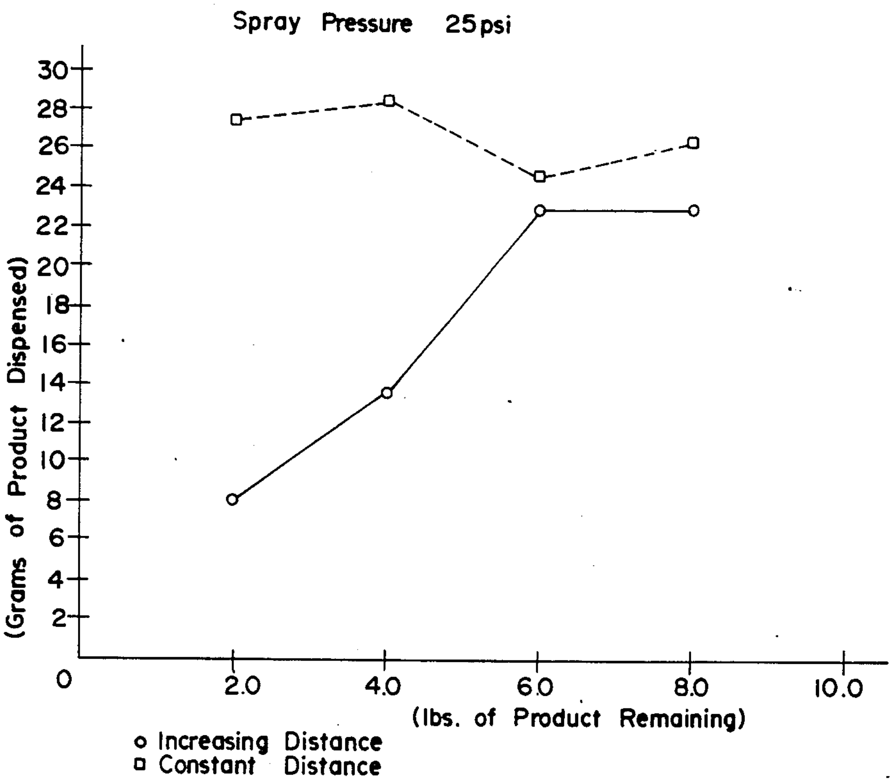

As shown in FIG. 6*a*, when the alternative embodiment of dispenser 20 utilizing the wash chemical pump 30 is used, the power source 201 is connected via conductor 64*a* to the input terminal 61*a* of float switch 60. Conductor 64*b* then connects float switch 60 with the input terminal 51*a* of safety switch 50 and conductor 54*b* connects the output terminal 51*b* of the safety switch 50 with the input terminal 120*a* of the safety control valve 120. In use the safety control valve 120 is normally closed to water flow therethrough. The power to open safety control valve 120 and allow the flow of water to spray nozzle 38 reaches valve 120 only if the float switch 60 is in its electronically closed state (level of wash chemical below the preset level) and the safety switch 50 is in its electronically closed state (door 34 closed).

For purposes of illustration, a dispenser system utilizing a conductivity sensing means to control the flow of water to spray nozzle 38 will be described.

Figure 7:
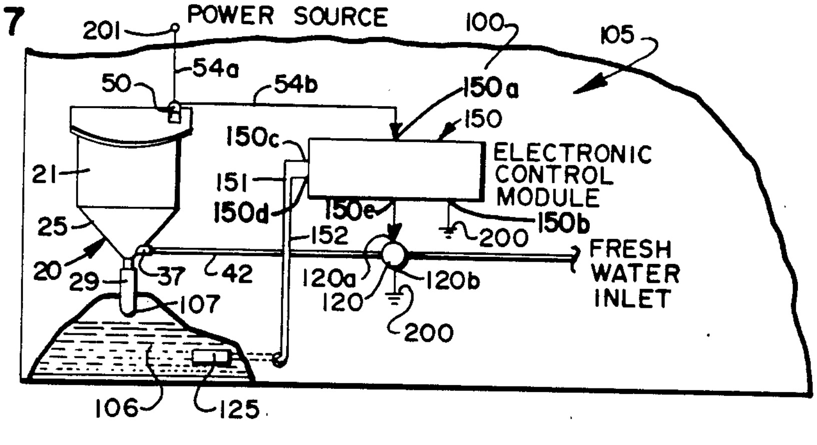
FIG. 7 is a schematic block diagram illustrating the circulatory and basic electrical signal flow paths of the dispensing system of a second embodiment of this invention.

Referring to FIG. 7, housing 20 is illustrated as mounted to side wall 100 of a washing machine 105 at a position above wash tank 106 of washing machine 105 such that conduit 29 and associated hose connecting extension 107 dispense the contents of collector portion 25 of housing 20 directly into reservoir 106. Water supply line 42 is directly connected to a source of pressurized water (not illustrated). Solenoid control valve 120 is connected in water supply line 42 between spray-forming nozzle 38 and the water supply source. Solenoid valve 120 has an input control terminal 120*a* and a common terminal 120*b* which is directly connected to a ground potential 200.

First conductor 54*a* leading from safety switch 50 is directly connected to a power source 201. Second conductor 54*b* leading from safety switch 50 is connected to a positive power supply input terminal 150*a* of an electronic control module 150. Electronic control module 150 further has a reference supply input terminal 150*b* which is directly connected to common potential 200, a first signal input terminal 150*c*, a second signal input terminal 150*d*, and a signal output terminal 150*e*. Signal output terminal 150*e* of electronic control module 150 is directly connected to control input terminal 120*a* of solenoid valve 120. First and second signal input terminals 150*c* and 150*d* of electronic control module 150 are directly connected by means of a pair of signal flow paths 151 and 152 respectively to terminals of a conductivity cell 125. Conductivity cell 125 is mounted within reservoir 106 of washing machine 105 for sensing the electrical conductivity of the solution contained therein.

An example of an electronic control module 150 which may be utilized in the present invention is disclosed in U.S. Pat. No. 3,680,070, issued to Markus I. Nystuen. In general, the electronic control module 150 is normally operable to provide a de-energizing signal output at its output terminal 150*e* when conductivity cell 125 indicates the conductivity (i.e. the wash chemical concentration level) of the wash tank solution within wash tank 106 is at or above a predetermined level and is operable to provide an energizing output signal at its signal output terminal 150*e* whenever conductivity cell 125 indicates that the conductivity (concentration level) of the solution within reservoir 106 has dropped below a predetermined minimum level. The signal output appearing at output terminal 150*e* of electronic control module 150 is used to energize input control terminal 120*a* of solenoid valve 120. The circuits within electronic control module 150 are energized from power source 201 by means of the serially connected safety switch 50. Therefore, whenever the safety switch 50 is operative in a non-conducting (open) mode, electronic control module circuits will be disabled, preventing passage of an energizing signal to solenoid valve 120, regardless of the conductivity indication status of conductivity cell 125.

Conductivity cell 125 may be of any type of such cell well known in the art, which provides an electrical output signal that varies in response to the electrical conductivity of the solution in which it is immersed.

It will be understood that other solenoid valve 120 activation and deactivation systems and indeed purely mechanical control systems could be used to control the flow of water to spray nozzle 38 and thereby control the dispensing of wash chemical, within the spirit and scope of this invention.

For use in the dispenser of this invention the solid block of wash chemical is packaged in an open faced, deformable container 500 having the same cross-sectional shape as the internal cavity 23 formed by the storage portion 21 of the housing 20. The open face is covered with a paraffin wax coated cellulosic cap 510 adhesively bonded to an outwardly extending peripheral flange 504 extending along the plane defined by the open face 501. The open face 501 must have a cross-sectional area at least equal to and preferably slightly greater than the cross-sectional area throughout the remainder of the inner cavity 505 defined by the container 500. This is necessary to allow the block of wash chemical 80 contained within the container 500 to be removed from the container 500 as a single solid unitary block 80.

The container 500 may be made of any material which may be deformed enough to break the bonds between the solid block of wash chemical 80 and the container 500, thereby allowing the block of wash chemical 80 to fall from the container 500 when the container 500 is inverted. Preferably the container 500, and therefore the internal cavity as well, is a right circular cylinder. To aid in bonding the cap 510 to the container 500 and also to aid in removing the block of wash chemical 80 from the container 500 the container 500 preferably has an outwardly extending peripheral flange 504 lying in the plane defined by the open face 501. The container 500 is preferably about 6 to 12 inches in diameter, about 1 to 4 inches thick and made of a flexible plastic such as polyethylene, polypropylene, polyvinyl chloride, etc.

At the point of use, the cap 50 is removed, the container 500 inverted over the access port 24 of the dispenser 20, and the container 500 is distorted, breaking the bonds between the solid block of wash chemical 80 and the container 500, thereby allowing the block of wash chemical 80 to fall by gravity from the container 500 onto the support screen 40 below. The container 500 and the cap 50 may then be discarded, the door 34 placed in a closed position over the access port 24, and the dispenser is then ready for use. Preferably, the cross-sectional area of the solid block of wash chemical 80 is just slightly smaller than the cross-sectional area of the internal cavity 23 defined by the storage portion 21 of the housing 20, thereby allowing the solid block of wash chemical 80 to fall freely onto the support screen 40, yet preventing the passage of water sprayed from the nozzle 38 between the inner wall 22 of the storage portion 21 and the lateral area 503 of the block of wash chemical 80 and into contact with other wash chemical blocks (not shown) contained above the wash chemical block 80 resting directly upon the support screen 40 or up to the door 34.

OPERATION OF THE PREFERRED EMBODIMENT

Operation of the dispensing apparatus of this invention is relatively simple and is briefly described below with reference to FIG. 6. A block of solid wash chemical 80 is loaded into upper storage portion 21 of housing 20 through access port 24 by removing cap 50, inverting container 500, open face 501 down, directly over access port 24 and "popping" the block of wash chemical 80 contained in container 500 onto support screen 40. Therefore, the cross-sectional area of the wash chemical block 80 should be about the same size as the cross-sectional area of inner cavity 23 to allow the block to rest flatly upon support screen 40 and also prevent water spray from passing between the lateral surface area 503 of wash chemical block 80 and inner wall 22 and wetting other wash chemical blocks (not shown) above or spraying onto door 34.

To be able to "pop-out" the block of wash chemical 80, the container 500 must have an open face 501 at least as large and preferably slightly larger, than its base 502 and must have no inner peripheral bumps, ridges or edges which can prevent the solid block of wash chemical 80 from sliding out of the container 500. To load dispenser 20, door 34 must be lifted to an upright position as indicated in dashed lines in FIG. 2 before inverting container 500 over access port 24. In the preferred embodiment, housing 20 will typically hold 3 1.0 to 1.5 Kg. blocks of wash chemical 80 but can be readily sized to hold up to 5 or 6 blocks. However, it will be understood that other sizes could equally well be configured within the scope of this invention.

When door 34 is raised out of sealing engagement overlying access port 24, the mercury 53 within safety switch 50 will be disposed within insulating bulb 52 of safety switch 50 so as to electrically open the signal path between first and second terminals 51*a* and 51*b* of the safety switch 50. Solenoid valve 120 is connected so as to be open to fluid flow while in receipt of an energizing signal from the safety switch 50. However, when signal flow to solenoid valve 120 is blocked by means of open safety switch 50, solenoid valve 120 will close, blocking further fluid flow to spray-forming nozzle 38. Under normal operation, a fluid flow path is established from the water source through water supply line 42 to spray-forming nozzle 38 whenever rinse valve 109 is opened, either electronically or manually. When provided with fluid flow therethrough, spray-forming nozzle 38 will direct a spray pattern at the bottom surface of support screen 40, wetting that wash chemical 80 carried immediately thereabove 81, which dissolves and passes in solution through support screen 40 to collector portion 25 of housing 20. Thus, concentrated wash chemical solution is produced in this arrangement of the apparatus, whenever rinse valve 109 is opened and door member 34 is closed so as to enable safety switch 50. The concentrated detergent solution passes through outlet port 27 of housing member 20 and is directed by conduit 29 to its utilization point.

WASH CHEMICAL COMPOSITIONS

Disclosed below is a nonexhaustive list of wash chemical compositions which may be cast or compressed into solid blocks 80 and utilized in the present invention.

| Laundry Detergent (Low Alkalinity) | |
|---|---|
| Raw Material | Percent |
| Polyethylene oxide M.W. 8000 | 25.40 |
| Neodol 25-7, Linear Alcohol Ethoxylate(1) | 30.0 |
| Dimethyl distearyl ammonium chloride | 3.0 |
| Tinopal CBS, Optical Dye(2) | 0.1 |
| Carboxymethyl cellulose | 1.5 |
| Sodium tripolyphosphate | 35.0 |
| Sodium metasilicate | 5.0 |
| | 100.0 |

(1)Trade name - Shell Chemical Co.
(2)Trade name - Ciba Giegy

The polyethylene oxide and the dimethyl distearyl ammonium chloride are mixed together and melted at a temperature of about 160° to 180° F. The remaining items are then added to the melt and mixed until a uniform product is obtained, about 10 to 20 minutes. The mixed product thusly obtained is then poured into a container 500 and cooled below its melting point which is about 140° F.

EXAMPLE II

| Neutral Hard Surface Cleaner | |
|---|---|
| Raw Material | Percent |
| Nonyl phenol ethoxylate 15 moles of ethylene oxide | 80.0 |
| Polyethylene oxide M.W. 8000 | 20.0 |
| | 100.0 |

The nonyl phenol ethoxylate 15 moles of ethylene oxide and polyethylene oxide are mixed together and melted at a temperature of about 160° to 180° F. The product is then poured into a container 500 and cooled below its melting point which is about 150° F.

EXAMPLE III

| High Alkaline Industrial Laundry Detergent | |
|---|---|
| Raw Material | Percent |
| Sodium hydroxide - 50% | 26.00 |
| Dequest 2000(1) | 17.00 |
| Polyacrylic acid - 50% M.W. 5000 | 6.50 |
| Nonylphenol ethoxylate 9.5 mole ratio | 14.00 |
| Tinopal CBS(2) | 0.075 |
| Sodium hydroxide | 36.425 |
| | 100.0 |

(1)Trademark - Monsanto Chemical Co.
(2)Trademark - Ciba-Giegy

All ingredients except the sodium hydroxide are mixed together and melted at a temperature of about 170° F. The sodium hydroxide is then added and mixed until a uniform product is obtained. The product is poured into a container 500 and cooled.

EXAMPLE IV

| Institutional Dishwashing Detergent | |
|---|---|
| Raw Material | Percent |
| Sodium hydroxide 50% solution | 50.0 |
| Sodium hydroxide bead | 25.0 |
| Sodium tripolyphosphate | 25.0 |
| | 100.0 |

The sodium hydroxide bead is added to the sodium hydroxide 50% solution, heated to 175° F. and mixed. The sodium tripolyphosphate is then added and mixed until uniform, about 10 to 20 minutes. This mixture is poured into a container 500 and cooled rapidly to solidify the product.

EXAMPLE V

| Solid Rinse Aid | |
|---|---|
| Raw Material | Percent |
| Polyethylene glycol (M.W. 8000) | 30.0 |
| Sodium xylene sulfonate | 20.0 |
| Pluronic(1) L62 | 40.0 |
| Pluronic(1) F87 | 10.0 |
| | 100.0 |

(1)BASF Wyandotte trademark for ethyleneoxide-propyleneoxide block copolymers.

The polyethylene glycol is melted at a temperature of about 160° F. The sodium xylene sulfonate granules or flakes are added and mixed into the polyethylene glycol melt. Pluronic L62 and F87 are then added and mixed until the melt is uniform, about 10 to 20 minutes. The mixture is then poured into container 500 and allowed to cool and solidify.

Other modifications of the invention will be apparent to those skilled in the art in light of the foregoing description. This description is intended to provide concrete examples of individual embodiments clearly disclosing the present invention. Accordingly, the invention is not limited to these embodiments or to the use of specific elements therein. All alternative modifications and variations of the present invention which fall within the spirit and broad cope of the appended claims are covered.

EXAMPLE VI

Comparative Dispensing Tests

A capsule and a container were each charged with approximately 8 lbs. (3.63 killograms) of the laundry detergent described in Example I. The detergent in the container was dispensed utilizing the dispenser of this invention (i.e. "popping out" the block of detergent onto a support screen and spraying water upon the downwardly facing surface of the detergent block).

The detergent in the capsule was dispensed by inverting the capsule over a spray nozzle and spraying water into the capsule and onto the exposed surface of the detergent contained in the capsule. The means of dispensing the detergent from the capsule and the container was the same except that the detergent in the container was removed from the container and placed onto a support screen so that the distance between the spray nozzle and the exposed dissolving surface of the detergent would remain constant throughout use of the detergent, while the detergent in the capsule was dispensed from within the capsule such that as the detergent in the capsule was utilized the distance between the spray nozzle and the exposed dissolving surface of the detergent would increase.

When approximately 8, 6, 4 and 2 lbs. of detergent were remaining (determined for the capsule by weighing the capsule and determined for the container by titrating a sample of the total concentrated detergent solution formed and measuring the amount of solution formed in accordance to the equation shown below) an amount of detergent dispensed during subsequent dispensing sprays of 20 seconds was calculated by titrating 5 samples of the concentrated detergent solution created during 5 20-second tests and averaging the results.

The amount of detergent dispensed was calculated by making a standard 1 wt-% solution of the detergent and titrating 100 g. of the 1 wt-% detergent solution to a pH of 8.3 with a 0.1 N acid standard to determine the volume of standard required to reach the equivalence point (pH 8.3) for 1 gram of detergent. The volume required was a constant of 12.7 ml. A 100 g. sample of the solution formed during each 20-second test was then titrated with the 0.1 N acid standard and the volume of standard used to reach the equivalence point (pH 8.3) recorded. The data obtained is then placed into the following equation and the total amount of detergent dispensed during the 20-second test calculated.

Detergent dispensed (grams) =

-continued $$\left(\begin{array}{l}\text{Total Volume of}\\ \text{Concentrated}\\ \text{Solution}\\ \text{Dispensed (ml)}\end{array}\right)\left(\frac{\text{Standard Titrated (ml)}}{\text{(12.7 ml)}}\right)\left(\frac{1}{100}\text{ --}\right)$$

With respect to the capsule, the 8, 6, 4 and 2 lbs. of detergent remaining in the capsule correlated approximately to a distance between the nozzle and the exposed surface of the detergent of about 1.5, 2.5, 3.5, and 4.5 inches respectively. The constant distance between the nozzle and the downwardly facing surface of the solid block of detergent from the container was 1.75 inches.

Data was collected for spray pressures of 10, 15, 20, and 25 p.s.i. (those normally used in such dispensers) and the results tabulated in Table 1 and graphically depicted in FIGS. 10-13. As can readily be seen from the capsule data, the amount of detergent dispensed over a constant period of time (in this case 20 seconds) decreases as the distance between the nozzle and the exposed dissolving surface of the detergent increases. Utilizing the dispenser of the present invention, the distance between the nozzle and the exposed surface of the detergent remains constant as the detergent is utilized, and as can be seen maintains the amount of detergent dispensed over a constant period of time relatively constant.

As Example VI shows, the actual concentration of the wash chemical solution dispensed is dependent upon the distance between the nozzle and the exposed surface of the wash chemical. Therefore, if the dissolving wash chemical is dispensed on a timed basis the actual amount of wash chemical dispensed will vary. The dispenser of the present invention eliminates this variable by maintaining a constant distance between the nozzle and the exposed surface of the wash chemical and thereby increases the reliability of dispensers which dispense wash chemical based upon spray time only.

TABLE 1

| Spray Pressure (p.s.i.) | Product Remaining in Dispenser (lbs.) | Product Dispensed in 20 Sec. (G) |
|---|---|---|
| | Container Constant | |
| 10 | 8 | 10.75 |
| | 6 | 8.57 |
| | 4 | 10.52 |
| | 2 | 11.75 |
| 15 | 8 | 18.75 |
| | 6 | 16.41 |
| | 4 | 15.80 |
| | 2 | 19.20 |
| 20 | 8 | 19.51 |
| | 6 | 18.75 |
| | 4 | 16.50 |
| | 2 | 19.47 |
| 25 | 8 | 26.52 |
| | 6 | 24.72 |
| | 4 | 28.51 |
| | 2 | 27.53 |
| | Capsule (Increasing Distance) | |
| 10 | 8 | 9.60 |
| | 6 | 5.85 |
| | 4 | 2.05 |
| | 2 | 1.35 |
| 15 | 8 | 15.25 |
| | 6 | 7.45 |
| | 4 | 5.40 |
| | 2 | 3.40 |
| 20 | 8 | 18.00 |
| | 6 | 11.55 |
| | 4 | 7.75 |
| | 2 | 6.20 |
| 25 | 8 | 23.00 |

TABLE 1-continued

| Spray Pressure (p.s.i.) | Product Remaining in Dispenser (lbs.) | Product Dispensed in 20 Sec. (G) |
|---|---|---|
| | 6 | 23.00 |
| | 4 | 13.70 |
| | 2 | 8.20 |

I claim:

1. A means for dispensing a concentrated aqueous wash chemical solution from a solid block of a wash chemical to a utilization point, which comprises:
   (a) a housing for the solid block of wash chemical, comprising:
      (i) an upper storage portion which can retain more than one solid block of wash chemical and which allows a downwardly facing surface of the lowermost solid block of wash chemical to remain in substantially continuous contact with a flat, horizontal screen support means; the upper storage portion defining a storage cavity and having an upwardly disposed access port with a cross-sectional area at least as large as the cross-sectional area of the storage cavity for allowing access to the storage cavity;
      (ii) a door operatively engaged to the housing and positioned across the upwardly disposed access port, the door being movable with respect to the access port to open and close access to the storage cavity; and
      (iii) a funnel shaped collector portion integral with and extending continuously downward from the storage portion and terminating at a lower outlet port from the housing;
   (b) mounting means for mounting the housing onto a vertical support;
   (c) the flat horizontal screen support means in contact with the housing for retainably supporting more than one solid block of wash chemical thereabove;
   (d) spraying means mounted in the collector portion of the housing and below the screen supporting means for directing a uniform spray at substantially the entire downwardly facing surface of the lowermost solid block of wash chemical such that the concentrated aqueous wash chemical solution is formed by dissolution of substantially only the downwardly facing surface of the lowermost solid block of wash chemical;
   (e) a wash chemical solution conduit connecting the outlet port with the utilization point for directing the concentrated wash chemical solution from the collector portion of the container to the utilization point;
   (f) a water supply line connecting the spraying means with a pressurized source of water;
   (g) spray control means cooperatively connected to the water supply line for selectively controlling the flow of water through the supply line and onto the spray means, the spray control means being operative in response to receipt of a control signal to open the water supply line to water flow therethrough, causing the spray means to direct a spray of water against substantially the entire downwardly facing surface of the solid block of wash chemical retainably supported immediately above the support screen, dissolving that wash chemical contacted with water which then passes in solution through the support screen to the underlying collector portion of the container, through the outlet port, to the conduit and onto the utilization point.

2. The dispenser of claim 1 further comprising a safety control switch responsive to movement of the door for blocking water spray from the spray means whenever the door is moved from a closed position overlying the access port of the housing, thereby preventing the creation of concentrated wash chemical solution when the access port is open.

3. The dispenser of claim 2, wherein the safety control switch comprises:
   (a) an electrically actuated safety valve in the water supply line, normally operable in response to receipt of a first electrical signal to allow free flow of water through the supply line and responsive to receipt of a second electrical signal to block the flow of water through the water supply line; and
   (b) electronic switching means operatively connected with the safety valve for sensing the operative position of the door and selectively producing in response thereto, the first and the second electrical signals, the electronic switch being normally operative when the door is operatively disposed in a closed position over the access port of the container, to produce the first electrical signal, and being operable in response to movement of the door away from the closed position to produce the second electrical signal, causing the safety valve to close.

4. The dispenser of claim 1 further comprising a lower screen in contact with the collector portion of the container above the outlet port and below the spray forming means for preventing the passage of nondissolved solid block wash chemical into the conduit wash chemical solution.

5. The dispenser of claim 2 wherein the storage cavity comprises a right cylinder capable of retaining more than one right circular cylindrical solid blocks of wash chemical and having a base area slightly larger than the base area of the wash chemical solid blocks placed therein for allowing the solid block to fall virtually unimpeded from the access port to the supporting screen while preventing the passage of sprayed water between the inner wall of the storage portion and the lateral surface of the wash chemical solid block.

6. The dispenser of claim 4 wherein the support screen has about 0.125 to about 3.0 inch openings and the lower screen has about ¼ to about 1/20 inch openings.

* * * * *